Palser & Howland. Sheet 1, 2 Sheets.

Pulp Digester.

No. 1,590. Reissued Dec. 15, 1863.

Witness:
Andrew Anderson Jr.

Inventors:
Joseph B. Palser
Gardner Howland
By their Atty C. S. Renwick

Palser & Howland. Sheet 2, 2 Sheets.

Pulp Digester.

No. 1590. Reissued Dec. 15, 1863.

Witnesses
Andrew Anderson

Inventors;
Joseph B. Palser
Gardner Howland
by their Att. E. F. Rimmick

UNITED STATES PATENT OFFICE.

JOSEPH B. PALSER AND GARDNER HOWLAND, OF FORT EDWARD, NEW YORK.

IMPROVEMENT IN THE PREPARATION OF STRAW FOR PAPER-PULP.

Specification forming part of Letters Patent No. 24,484, dated June 21, 1859: Reissue No. 997, dated July 3, 1860; Reissue No. 1,590, dated December 15, 1863.

*To all whom it may concern:*

Be it known that we, JOSEPH B. PALSER and GARDNER HOWLAND, of Fort Edward, in the county of Washington, in the State of New York, have invented certain new and useful Improvements in the Manufacture of Paper-Pulp from Straw and other Fibrous Materials; and we do hereby declare that the following is a full and exact description thereof, reference being had to the accompanying drawings, making part of this specification, in which—

Figure 1:
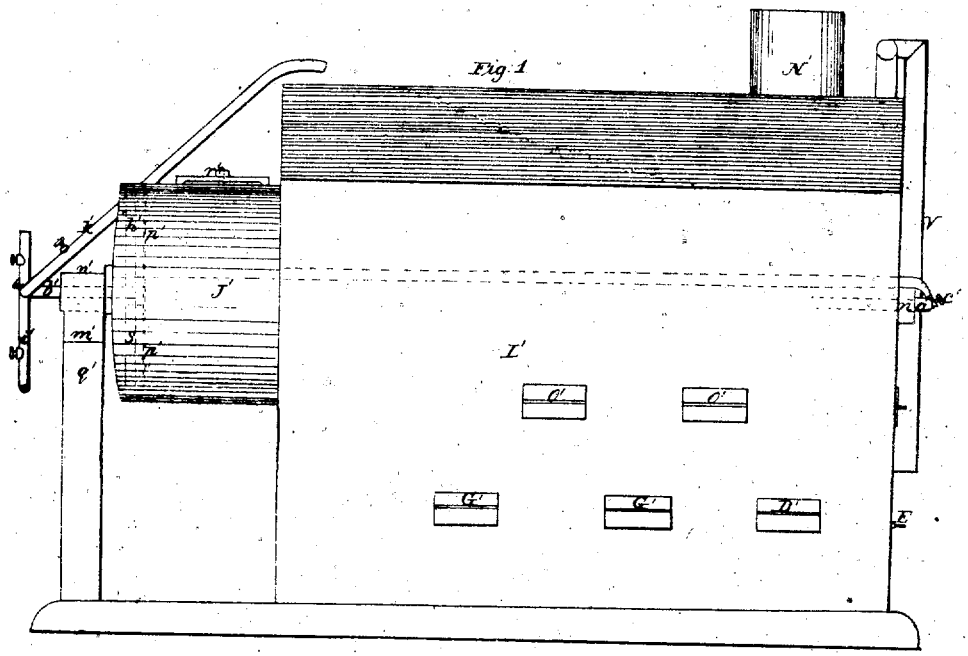
Figure 2:
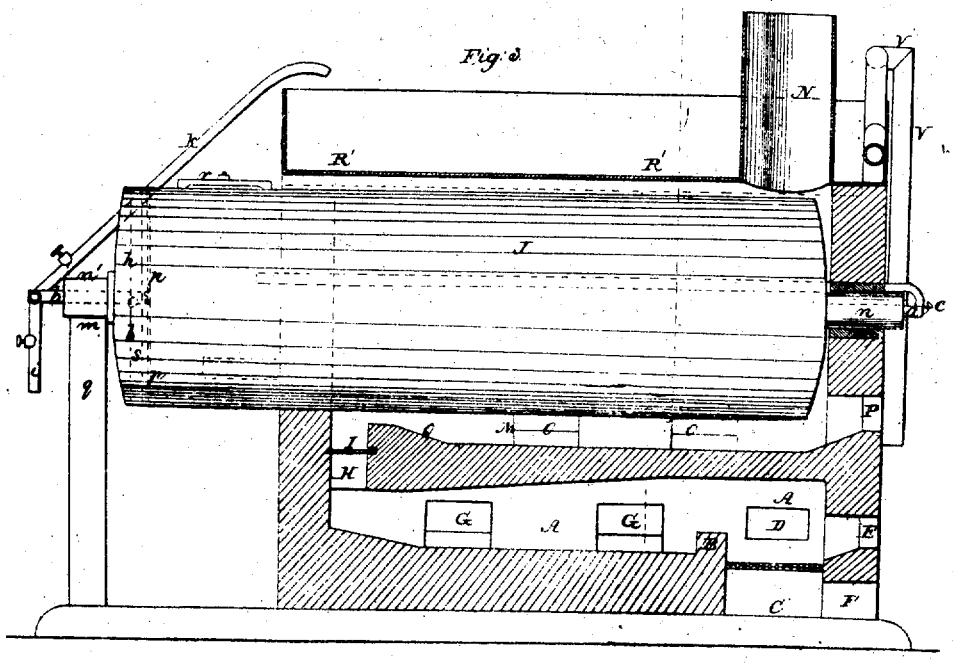
Figure 2:
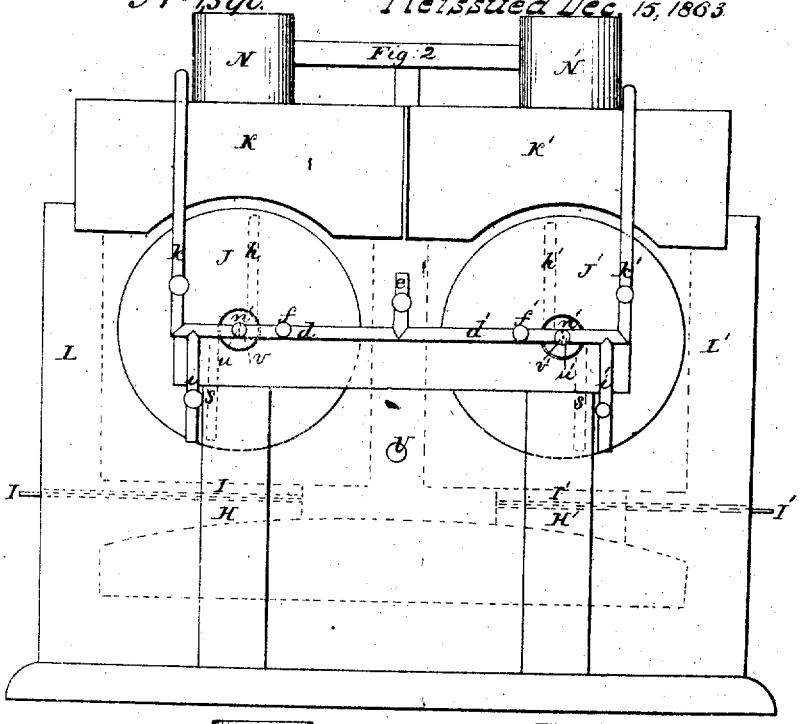
Figure 4:
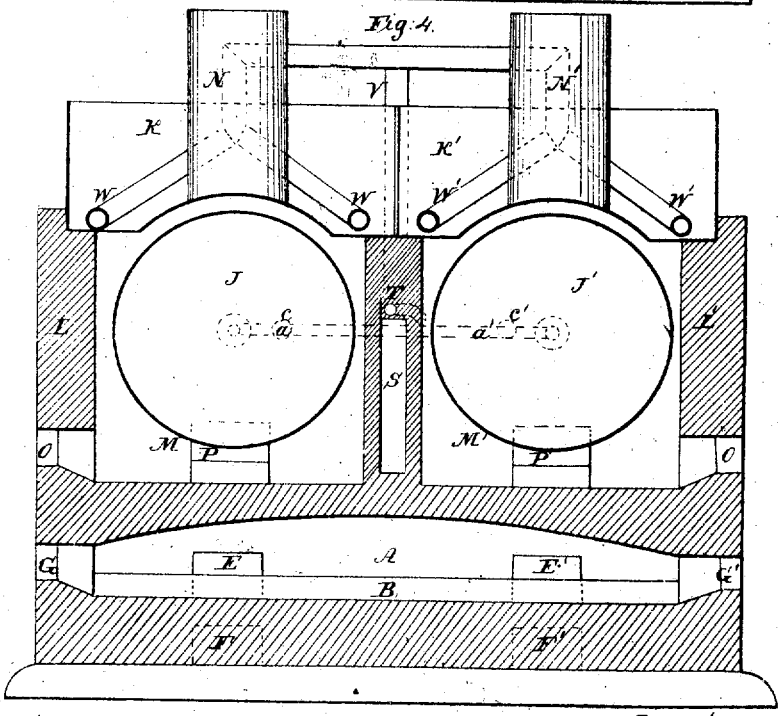

Figure 1 is a side view of the apparatus employed by us in practicing our invention; Fig. 2, an end view of the same; Fig. 3, a longitudinal section of the same, and Fig. 4 a transverse section of the same.

Similar letters of reference indicate corresponding parts in the several figures.

The object of our invention is to obtain from straw or similar stalks a fibrous material which is free from the glutinous and resinous matters of the straw or other stalks. We have discovered that by subjecting crushed straw previously cut into short lengths to the simultaneous action of an alkaline solution, agitation, and a high temperature, such as is produced by the exposure of the exterior of the digesting-vessel to the products of the combustion of a hot fire, a change is produced in the organization of the glutinous and resinous matters that exist in the straw without injury to the fiber with which they are combined, so that the fiber may be separated from them by washing and be in a suitable condition for the manufacture of paper for printing and writing purposes. The alkaline solution or liquid which we have used with success is a solution of caustic soda in water of a strength of $3\frac{1}{2}°$ to $3\frac{3}{4}°$ of Baumé's hydrometer, and in the proportion of sixty gallons to one hundred pounds of cut straw. The temperature produced by the fire has been sufficient to maintain a pressure of from one hundred and ten to one hundred and thirty pounds to the square inch in the interior of the digesting vessel, or "boiler", as it is commonly called. The agitation of the material we have produced by using a cylindrical boiler and causing it to revolve slowly in the furnace in which it is heated.

To enable those skilled in the art of manufacturing paper to practice our said invention or discovery, we will proceed to describe the construction and operation of the apparatus we have devised for the purpose.

Our apparatus consists of a reverberatory furnace upon which stand side by side two rotary boilers, each inclosed in a separate envelope, the whole being crowned with two iron vats, one over each boiler.

In the accompanying drawings, A A is the reverberatory furnace, B the fire-bridge, C the fire-place, D D′ and E E′ the fire-doors, F F′ ash or draft openings, G G and G′ G′ doors to the reverberatory furnace, and H′ H′ are two passages which may be closed by the sliding valves I I′.

J J′ are two rotary boilers strong enough to sustain with safety an internal pressure of one hundred and thirty pounds to the square inch; K K′ two iron vats above the boilers. L L and L′ L′ are brick envelopes which inclose the boilers and support the vats K K′. M M M′ M′ are spaces between the envelopes and the boilers, forming a flue. N N are chimneys leading from the spaces M M M′ M′ into the open air through the vats. O O P and O′ O′ P′ are doors giving access to the spaces M M M′ M′. The sills of these doors are a few inches higher than the floor of the spaces M M M′ M′, and these floors are raised at Q to prevent liquids running into the oven or reverberatory furnace below. The doors G G G′ G′ are higher than the floor of the furnace A A for the same reason. Part of the bottoms of the vats K K′ are made cylindrical to encircle the boilers and form the upper part of the boiler-envelope. R R R′ R′ are holes (closed with plugs) through which the liquid is dropped from the vats over the rotary boilers. Inside the walls which separate the two boilers are a longitudinal passage, S, and a pipe, T, for warming air and water, respectively.

Air is forced by a blowing engine through pipe U and passage S. At the other end of this passage the air goes through a pipe, V, and branch pipes W W W′ W′, and escapes through a number of small holes into the liquid contained in the vats for the purpose of accelerating its evaporation.

The pipe T leads from a reservoir of water or of the alkaline liquid placed on a higher level than both rotary boilers, and it permits such liquids to be warmed when needful in their passage through this pipe. The pipe T T′ is divided into two branch pipes, *a* and *a′*, each of which turns into one of the boilers through stuffing-boxes in the journal, and is provided with a faucet, *c c′*. The pipe T T′ and branches *a a′* are used to fill the boilers with water or other liquids. At the other ends of the boilers pipes *b b′* enter therein through journals *n′ n′*. These pipes are divided lengthwise into two pipes, *v v′* and *u u′*, by partitions shown in Fig. 2. The pipes *v v′* are intended for steam, and are united together by a pipe, *d d′*, provided with faucets *f f′*.

On the pipe *d d′* is a branch pipe, *e*, on which a safety-valve and a steam-gage may be placed. The pipes *d d′* and *v v′* are united with the upper portions or steam-chambers of the boilers by pipes *h h′*; also, liquid portions by *s* and *s*.

The pipes *u u′* are used to empty the boilers from liquids. These pipes extend to the lowest parts of the boilers by pipes *s s′*, and the liquids which are forced out through them may be sent into the vats K K′ through pipes *k k′*, or may be discharged into the gutter through pipes *i*.

The pipes *h h′* and *s s′* are separated from the "stock" in the boiler by the perforated partitions *p p p′ p′*, and thus they cannot be broken or even bent by the pressure of the revolving stock in its own apartment, and yet permit the drawing off of all the liquid matters at any desired time during the operation hereinafter to be described.

The desired arrangement of perforated partitions and pipes may be varied in several ways substantially the same. The rotary boilers J J′ are supported, as rotary boilers usually are, by journals *n n′*, secured to their ends. One end of each of the rotary boilers and a large portion of their surfaces are enveloped by the furnaces. The other ends project out sufficiently to leave room for man-holes *r r′*, and as a consequence the journals at these ends are supported on a frame, *q q′*, separated from the furnace. The journals at the opposite ends work in boxes *m*, built in the walls of the furnace itself.

The projecting ends of the boilers J J′ are to be connected with machinery, by which they can be caused to revolve slowly on their journals, a good speed being one-half of a revolution per minute. As such machinery is well known in paper-manufactures for the purpose of revolving the ordinary turning digesters, we do not deem it necessary to describe or represent it.

The machinery should be constructed in such manner that either boiler may be disconnected from the power that turns it, to permit it to remain at rest while the straw is charged into it and the digested matter is discharged.

The straw is first cut into suitable lengths—say three-quarters of an inch in length—by an ordinary straw-cutter. It is subjected to a winnowing process to cleanse it from dirt, &c., and is then crushed between a pair of iron rollers. It is now ready to be placed in the boiler.

The various operations performed with the apparatus are as follows, one of the boilers, J, having been emptied of its contents during the time the other, J′, was boiling, (and this boiling under high pressure being just completed:) First, the boiler J is filled with the straw or other material to be boiled through the man-hole *r*, which is then closed. Second, the pipe T is connected with the reservoir of alkaline liquid, and by opening the faucet *c* the necessary quantity flows into the boiler J and the faucet is then closed. Third, the revolving machinery is put in operation to cause the boiler J to revolve slowly. Fourth, the valve I′ is closed and valve I is open, and thus fire-heat is transferred from boiler J′ to boiler J. Fifth, the faucets *f f′* are opened and steam rushes from boiler J′ to boiler J until the temperature and pressure are equal in both. The faucets are then closed. This operation is very important as the means of raising the temperature in the boiler J in a much shorter time than can be done by fire-heat alone. It also assists in cooling the boiler J′, both of these effects being produced with an economy of time, labor, and fuel. Another important advantage of this discharge of the steam from one boiler into the other is that the steam of the boiling process becomes charged more or less with alkaline matter, which is carried over and mixed with the contents of the other boiler. A saving of alkali and of the heating thereof is thereby effected. Sixth, the faucet *l′* is opened and the steam remaining in the boiler J′ forces up the exhausted liquid into the vat placed above the boiler, after which the faucet is closed. Seventh, the plugs are drawn out of the holes R′ R′ and the liquid previously raised to the vat is discharged in suitable quantities at a time upon the top of a boiler that is immediately below. The exterior of this boiler becomes instantly enveloped by the descending liquid, parts of which, by contact with the upper surface of the boiler, are scattered and dashed against the surrounding walls, and thus coats them also. The result is that a rapid and extensive evaporation of the liquid takes place, being brought about by the dashing of the liquid upon the boiler and surrounded heated walls, as aforesaid. It is desirable that the heated surfaces of these parts should be cooled as rapidly as possible, in order that a new charge of material may be placed within the boiler. The descending liquid thickens by the evaporation and falls into the basin *g*, where it is collected and soon becomes viscous. This method of cooling the boiler and also evaporating the liquid refuse presents an important advantage in the economy of time and fuel. Eighth, the pipe T is adjusted to the reservoir of water to wash the materials in the boiler J′, which are finally emptied through the man-hole. Ninth, after boiling has been going on for the requisite time in the boiler J the liquid from the preceding operation in *g g* has become viscous; the viscous matter is pushed over Q into A A, where the inflammable matters take fire, and the boiling proceeds with the heat produced by them, the fire in grate C being kept as low as possible. In fact, the only reason for keeping it up at all is to avoid the trouble of rekindling it for beginning the next operation.

In such operations as the boiling of rags, &c., there is no residuum to burn. The oven or furnace would then be reduced to a flue, and the vats K K′ suppressed, except the strength of the liquor used was so sufficient that, by recovering its alkali, the expense of evaporating it would be repaid.

The boiling or digestion of the straw in the boiler is continued for about four hours, during which the straw is subjected to the action of the alkaline liquid, to the agitation produced by turning the boiler, and to the high temperature resulting from contact with the surface of the boiler.

The temperature we have used with success is sufficient to maintain a pressure of steam within the vessel of from one hundred and ten to one hundred and thirty pounds; but we believe that the straw in contact with the surface of the boiler, which is highly heated by the external fire, partially dries, so that it is heated to a much higher temperature than that which would produce steam of the above pressures from pure water, because if the straw be not agitated by turning the boiler that portion of it which is in contact with the bottom of the boiler chars, so that the fiber is destroyed. The agitation is therefore necessary to change the portions of straw in contact with the surface of the boiler, and to subject all portions of the mass within the boiler in succession to the action of the highly-heated surface.

The effect of the process appears to be the torrefaction and partial or complete solution of the glutinous and resinous matters of the straw without injury to the fibrous matter, and the result is that this matter can then be readily separated from the others by washing.

We do not claim, broadly, the boiling of straw or other materials in alkaline solutions under pressure, as we are aware that this has long been done in turning vessels at paper-manufactories, but without producing the change our process produces in the material acted upon.

What we claim as our invention, and desire to secure by Letters Patent, is—

The process of subjecting straw or similar stalks to the simultaneous action of an alkaline liquid, agitation, and a high temperature, such as is produced by contact with a surface heated by a fire-heat, whereby such a change is effected in the organization of the glutinous or resinous matters contained in the material that the fibrous material can be separated from them by washing.

In testimony whereof we have hereunto subscribed our names.

J. B. PALSER.
GARDNER HOWLAND.

Witnesses:
W. J. SIMMONS,
D. MAHAN.